(12) United States Patent
Hwang et al.

(10) Patent No.: US 11,438,106 B2
(45) Date of Patent: Sep. 6, 2022

(54) METHOD FOR TRANSMITTING AND RECEIVING HARQ-ACK SIGNAL AND DEVICE THEREFOR

(71) Applicant: LG Electronics Inc., Seoul (KR)

(72) Inventors: Daesung Hwang, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 46 days.

(21) Appl. No.: 16/982,119

(22) PCT Filed: Mar. 20, 2019

(86) PCT No.: PCT/KR2019/003239
§ 371 (c)(1),
(2) Date: Sep. 18, 2020

(87) PCT Pub. No.: WO2019/182349
PCT Pub. Date: Sep. 26, 2019

(65) Prior Publication Data
US 2021/0028893 A1 Jan. 28, 2021

(30) Foreign Application Priority Data

Mar. 20, 2018 (KR) .......................... 10-2018-0031833

(51) Int. Cl.
*H04L 1/18* (2006.01)
*H04W 76/28* (2018.01)
(Continued)

(52) U.S. Cl.
CPC .......... *H04L 1/1819* (2013.01); *H04L 1/0061* (2013.01); *H04L 5/0055* (2013.01); *H04W 72/042* (2013.01); *H04W 76/28* (2018.02)

(58) Field of Classification Search
CPC ... H04L 1/1819; H04L 1/0061; H04L 5/0055; H04L 1/1822; H04L 1/0003;
(Continued)

(56) References Cited

U.S. PATENT DOCUMENTS

2016/0249338 A1    8/2016  Hwang et al.
2018/0145797 A1*   5/2018  Yeo ........................ H04L 1/1896
(Continued)

FOREIGN PATENT DOCUMENTS

KR    1020130141600    12/2013
KR    101497850        3/2015
(Continued)

OTHER PUBLICATIONS

PCT International Search Report and Written Opinion in International Application No. PCT/KR2019/003239, dated Jul. 12, 2019, 18 pages (with English translation).

*Primary Examiner* — Kiet Tang
(74) *Attorney, Agent, or Firm* — Fish & Richardson P.C.

(57) ABSTRACT

The present disclosure provides a method for transmitting an HARQ-ACK signal by a UE in a wireless communication system. More particularly, the method is characterized by receiving control information for distinguishing first information and second information, receiving the first information and second information by means of at least one transmission block (TB), respectively decoding the first information and second information on the basis of the control information, and transmitting an HARQ-ACK signal on the basis of a decoding result with respect to the first information and a decoding result with respect to the second information. The reliability requirement of the first information is higher than the reliability requirement of the second information.

10 Claims, 15 Drawing Sheets

(51) Int. Cl.
*H04L 1/00* (2006.01)
*H04L 5/00* (2006.01)
*H04W 72/04* (2009.01)

(58) Field of Classification Search
CPC ... H04L 1/0009; H04L 1/1896; H04L 5/0064; H04L 5/0053; H04L 1/1812; H04W 72/042; H04W 76/28; H04W 76/20; H04B 7/0695
See application file for complete search history.

(56) References Cited

U.S. PATENT DOCUMENTS

2018/0270022 A1* 9/2018 Sun ................. H04L 1/1896
2018/0310298 A1* 10/2018 Li .................... H04L 5/0053
2020/0169358 A1* 5/2020 Ezaki ............... H04L 1/1896

FOREIGN PATENT DOCUMENTS

| KR | 101577437 | 12/2015 |
|----|-----------|---------|
| WO | WO2012039570 | 3/2012 |

* cited by examiner (A) CONTROL-PLANE PROTOCOL STACK (B) USER-PLANE PROTOCOL STACK

METHOD FOR TRANSMITTING AND RECEIVING HARQ-ACK SIGNAL AND DEVICE THEREFOR

CROSS-REFERENCE TO RELATED APPLICATIONS

This application is a National Stage application under 35 U.S.C. § 371 of International Application No. PCT/KR2019/003239, filed on Mar. 20, 2019, which claims the benefit of Korean Application No. 10-2018-0031833, filed on Mar. 20, 2018. The disclosures of the prior applications are incorporated by reference in their entirety.

TECHNICAL FIELD

The present disclosure relates to a method of transmitting and receiving a hybrid automatic repeat request (HARQ)-acknowledgement (ACK) signal and an apparatus therefor and, more particularly, to a decoding priority when data having different is received, a method of transmitting and receiving a HARQ-ACK signal, and an apparatus therefor.

BACKGROUND ART

As more and more communication devices demand larger communication traffic along with the current trends, a future-generation 5th generation (5G) system is required to provide an enhanced wireless broadband communication, compared to the legacy LTE system. In the future-generation 5G system, referred to as new RAT (NR), communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra high reliability, ultra low latency, and ultra high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DETAILED DESCRIPTION OF THE DISCLOSURE

Technical Problems

The present disclosure provides a method of transmitting and receiving a HARQ-ACK signal and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

According to an aspect of the present disclosure, provided herein is a method of transmitting a hybrid automatic repeat request (HARQ)-acknowledgement (ACK) signal by a user equipment (UE) in a wireless communication system, including receiving control information for distinguishing between first information and second information, receiving the first information and the second information through at least one transport block (TB), decoding each of the first information and the second information based on the control information, and transmitting the HARQ-ACK signal based on a decoding result for the first information and a decoding result for the second information. A reliability requirement of the first information may be higher than a reliability requirement of the second information.

The first information and the second information may be distinguished based on a HARQ process identifier (ID) included in the control information.

The first information and the second information may be distinguished based on cyclic redundancy check (CRC) masking included in the control information.

Based on the decoding result for the first information being negative ACK (NACK), HARQ-ACK information for the second information may be excluded from the HARQ-ACK signal.

Based on the decoding result for the first information being negative ACK (NACK), HARQ-ACK information for the second information may be processed as discontinuous transmission (DTX).

Based on ACK as the decoding result for the first information, the HARQ-ACK signal may be transmitted as ACK although the decoding result for the second information is negative ACK (NACK).

Based on the decoding result for the first information being negative ACK (NACK), the HARQ-ACK signal may be transmitted as NACK although the decoding result for the second information is ACK.

The method may further include receiving information about the number of code blocks for the first information among a plurality of code blocks included in one TB. Code blocks located at a front part of the one TB, corresponding to the number of code blocks, among the plural code blocks may be for the first information and remaining code blocks may be for the second information.

In another aspect of the present disclosure, provided herein is an apparatus for transmitting a hybrid automatic repeat request (HARQ)-acknowledgement (ACK) signal in a wireless communication system, including a memory; and at least one processor coupled to the memory, wherein the at least one processor is configured to receive control information for distinguishing between first information and second information, receive the first information and the second information through at least one transport block (TB), decode each of the first information and the second information based on the control information, and control transmission of the HARQ-ACK signal based on a decoding result for the first information and a decoding result for the second information. A reliability requirement of the first information may be higher than a reliability requirement of the second information.

In another aspect of the present disclosure, provided herein is a method of receiving a hybrid automatic repeat request (HARQ)-acknowledgement (ACK) signal by a base station (BS) in a wireless communication system, including transmitting control information for distinguishing between first information and second information, transmitting the first information and the second information through at least one transport block (TB), and receiving the HARQ-ACK signal generated based on a decoding result for the first information and a decoding result for the second information. A reliability requirement of the first information may be higher than a reliability requirement of the second information.

In another aspect of the present disclosure, provided herein is a user equipment (UE) for transmitting a hybrid automatic repeat request (HARQ)-acknowledgement (ACK) signal in a wireless communication system, including a transceiver; and at least one processor coupled to the transceiver, wherein the at least one processor is configured to control the transceiver to receive control information for distinguishing between first information and second information, control the transceiver to receive the first information and the second information through at least one transport block (TB), decode each of the first information and the second information based on the control information, and control the transceiver to transmit the HARQ-ACK signal based on a decoding result for the first information and a decoding result for the second information. A reliability requirement of the first information may be higher than a reliability requirement of the second information.

In another aspect of the present disclosure, provided herein is a base station (BS) for receiving a hybrid automatic repeat request (HARD)-acknowledgement (ACK) signal in a wireless communication system, including a transceiver; and at least one processor coupled to the transceiver, wherein the at least one processor is configured to control the transceiver to transmit control information for distinguishing between first information and second information, control the transceiver to transmit the first information and the second information through at least one transport block (TB), and control the transceiver to transmit the HARQ-ACK signal generated based on a decoding result for the first information and a decoding result for the second information. A reliability requirement of the first information may be higher than a reliability requirement of the second information.

Advantageous Effects

In accordance with the present disclosure, retransmission resources may be efficiently used according to the importance level or type of information received by a user equipment.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE FOR CARRYING OUT THE DISCLOSURE

Figure 1:
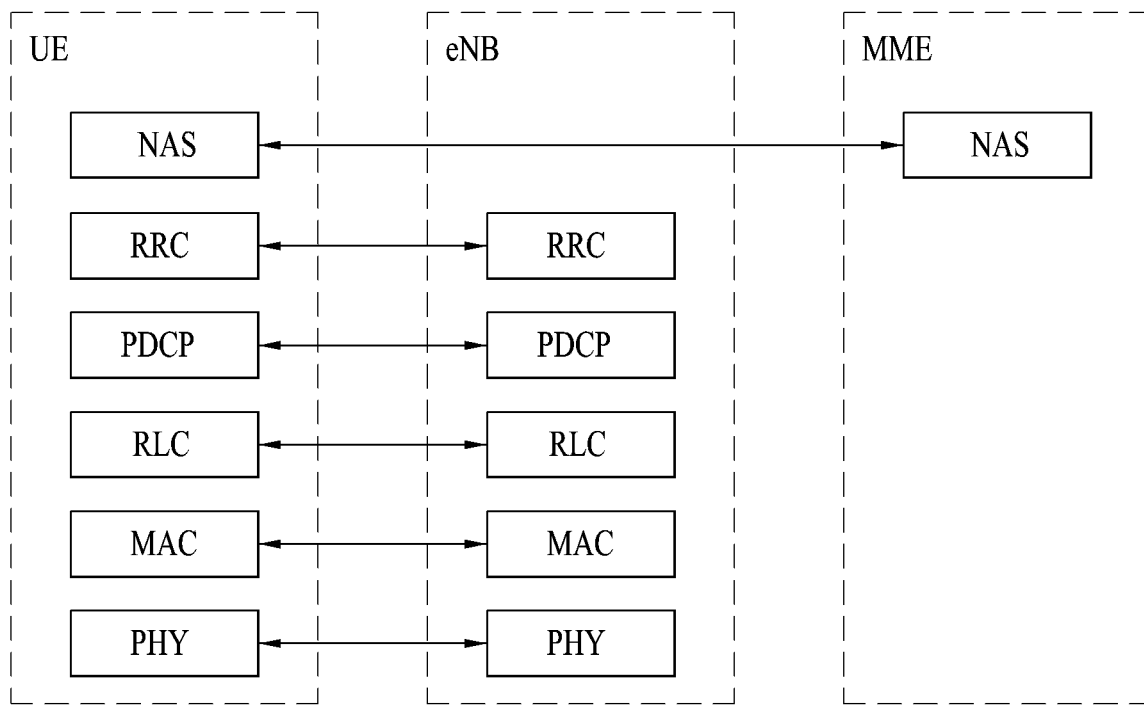
FIG. 1 is a view illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.
Figure 1:
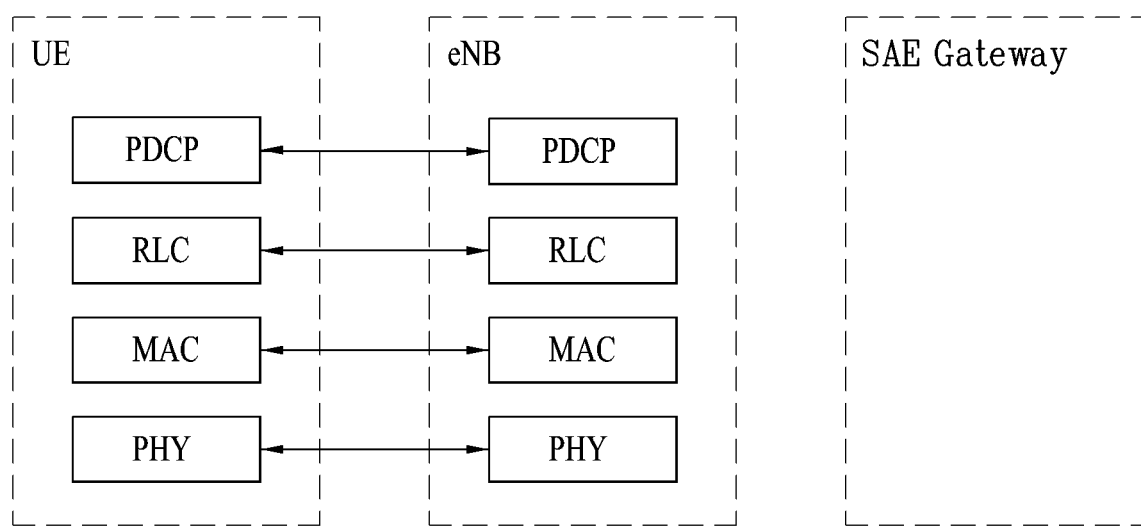

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a UE. For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/ negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates control-plane and user-plane protocol stacks in a radio interface protocol architecture conforming to a 3GPP wireless access network standard between a user equipment (UE) and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 2:
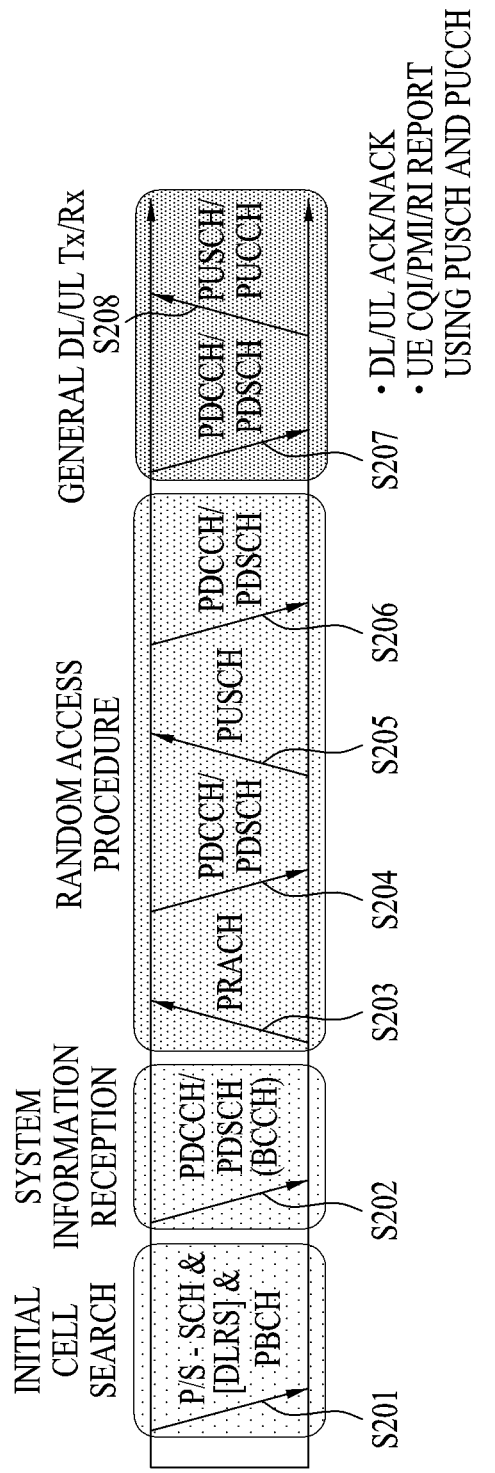
FIG. 2 is a view illustrating physical channels and a general signal transmission method using the physical channels in a 3GPP system.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

Figure 3:
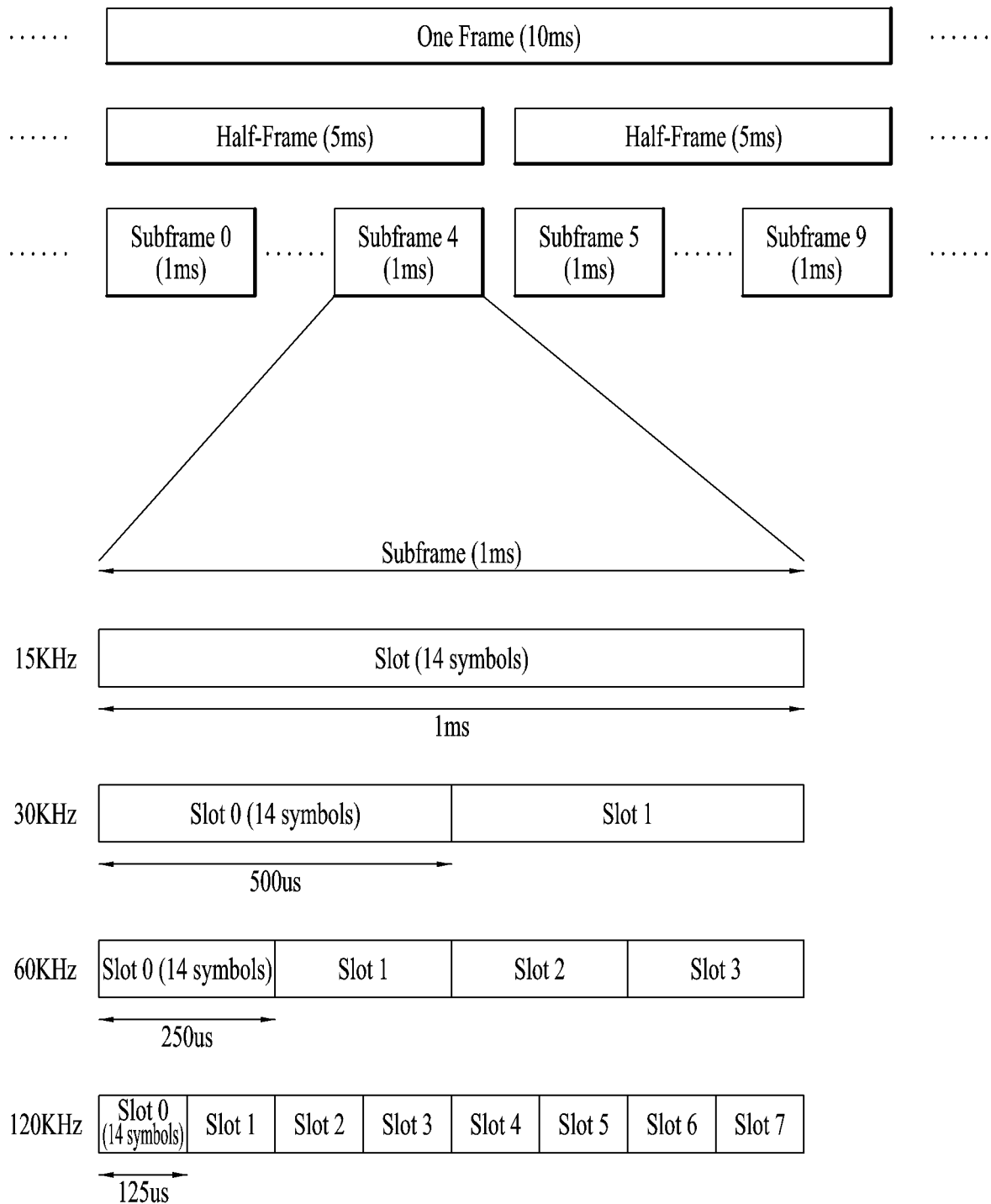
FIGS. 3 to 5 are views illustrating structures of a radio frame and slots used in the NR system.

FIG. 3 illustrates a structure of a radio frame used in NR.

In NR, UL and DL transmissions are configured in frames. The radio frame has a length of 10 ms and is defined as two 5 ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame, u}_{slot}$: Number of slots in a frame
*$N^{subframe, u}_{slot}$: Number of slots in a subframe

[Table 2] illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

Figure 4:
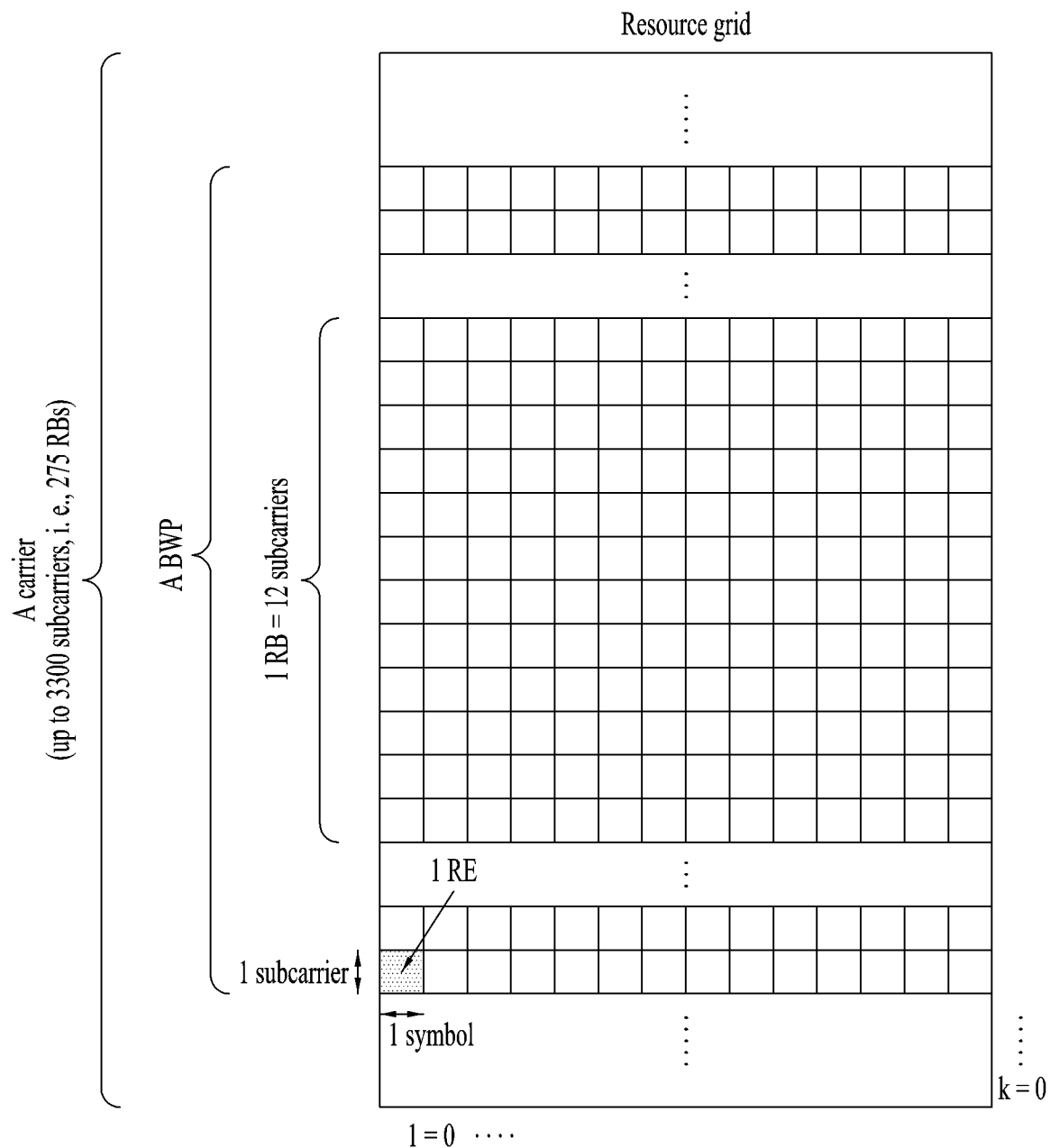

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells. FIG. 4 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 5:
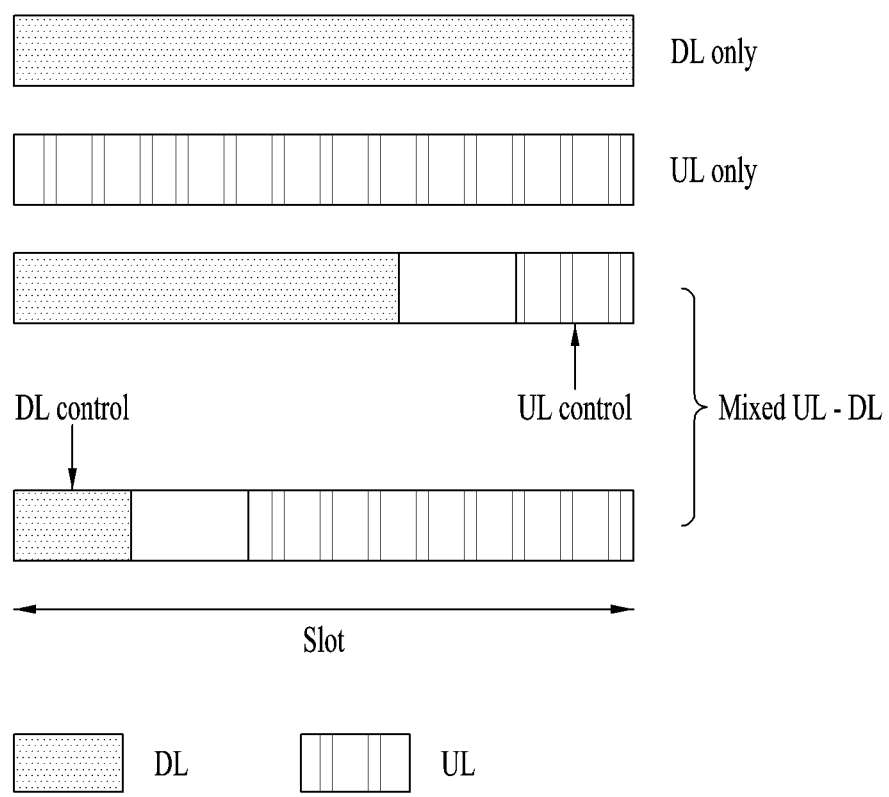

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.
 1. DL only configuration
 2. UL only configuration
 3. Mixed UL-DL configuration
 DL region+Guard period (GP)+UL control region
 DL control region+GP+UL region
 DL region: (i) DL data region, (ii) DL control region+DL data region
 UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

For NR system under discussion, a technique of using an ultra-high frequency band, that is, a millimeter frequency band at or above 6 GHz is considered in order to transmit data to a plurality of users at a high transmission rate in a wide frequency band. The 3GPP calls this technique NR, and thus a 5G mobile communication system will be referred to as an NR system in the present disclosure. However, the millimeter frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lambda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time is limited to or below B although the number of beam directions is different according to connections between B TXRUs and Q antenna elements.

Digital BF performs signal processing on a digital baseband signal that is to be transmitted or is received as mentioned above, and therefore it may transmit or receive signals in multiple directions at the same time using multiple beams. In contrast, analog BF performs beamforming with a received analog signal or an analog signal to be transmitted in a modulated state, and therefore it cannot simultaneously transmit or receive signals in multiple directions beyond the range covered by one beam. In general, a gNB communicates with multiple users at the same time using broadband transmission or multi-antenna characteristics. When the gNB uses analog or hybrid BF and forms an analog beam in one beam direction, the gNB is allowed to communicate only with users included in the same analog beam direction due to the characteristics of analog BF. A RACH resource allocation scheme and a scheme of resource utilization in the gNB according to the present disclosure to be described later are proposed in consideration of constraints resulting from the characteristics of analog BF or hybrid BF.

Figure 6:
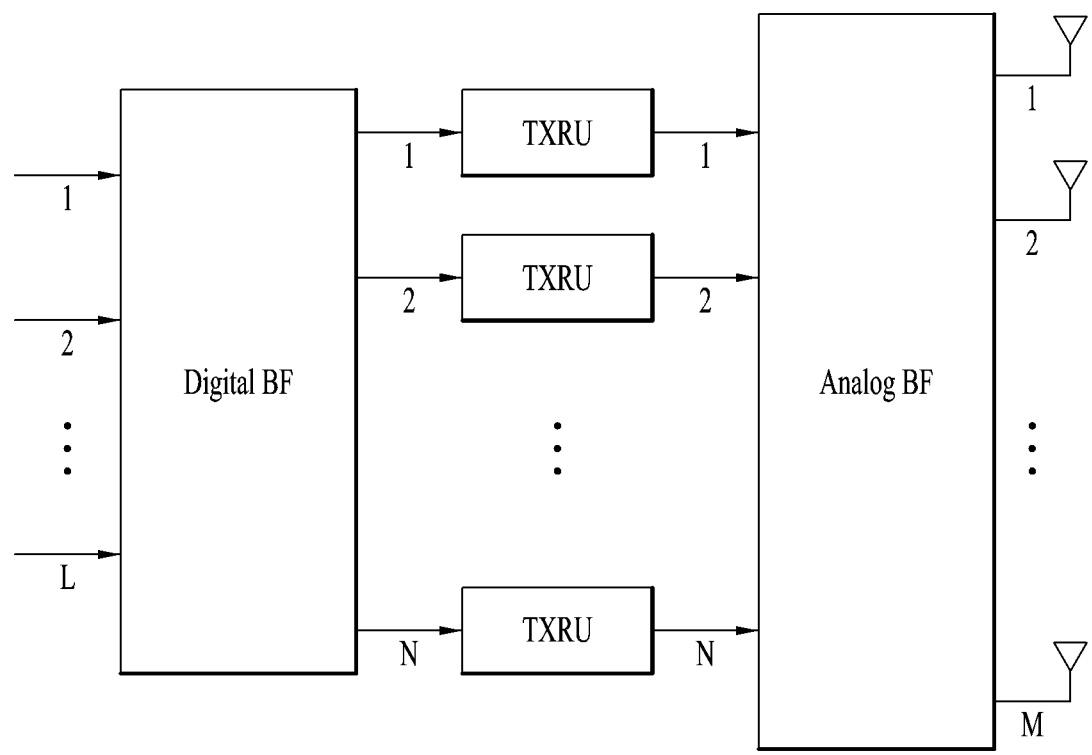
FIG. 6 is a view illustrating exemplary connection schemes between transceiver units (TXRUs) and antenna elements.

FIG. 6 abstractly illustrates a hybrid beamforming structure in terms of TXRUs and physical antennas.

Figure 7:
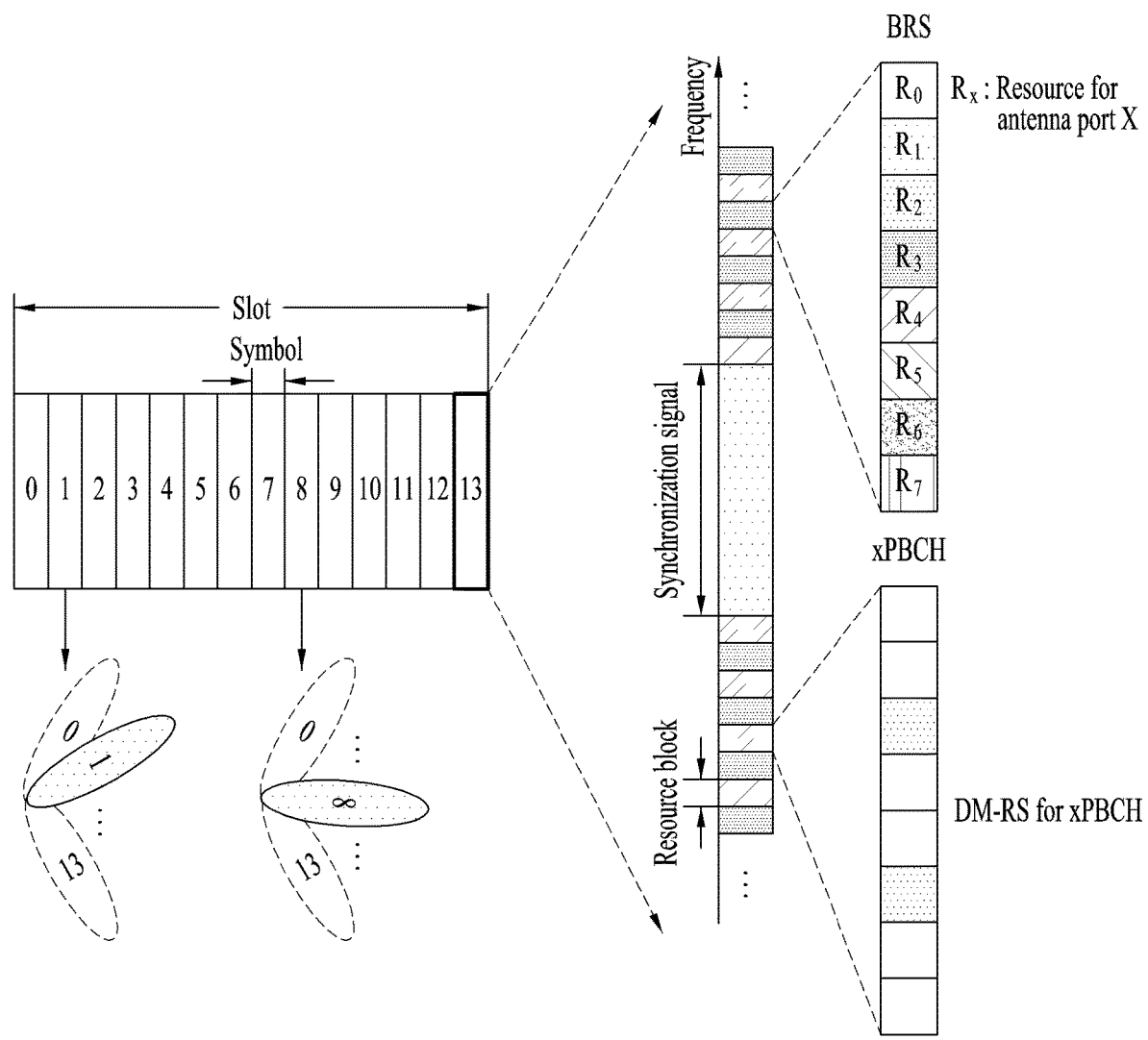
FIG. 7 is a view illustrating beam sweeping for a synchronization signal and system information during downlink (DL) transmission.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix. In FIG. 7, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered. As such, in the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

FIG. 7 is a view illustrating beam sweeping for an SS and system information during DL transmission. In FIG. 7, physical resources or a physical channel which broadcasts system information of the New RAT system is referred to as an xPBCH. Analog beams from different antenna panels may be transmitted simultaneously in one symbol, and introduction of a beam reference signal (BRS) transmitted for a single analog beam corresponding to a specific antenna panel as illustrated in FIG. 7 is under discussion in order to measure a channel per analog beam. BRSs may be defined for a plurality of antenna ports, and each antenna port of the BRSs may correspond to a single analog beam. Unlike the BRSs, the SS or the xPBCH may be transmitted for all analog beams included in an analog beam group so that any UE may receive the SS or the xPBCH successfully.

Figure 8:
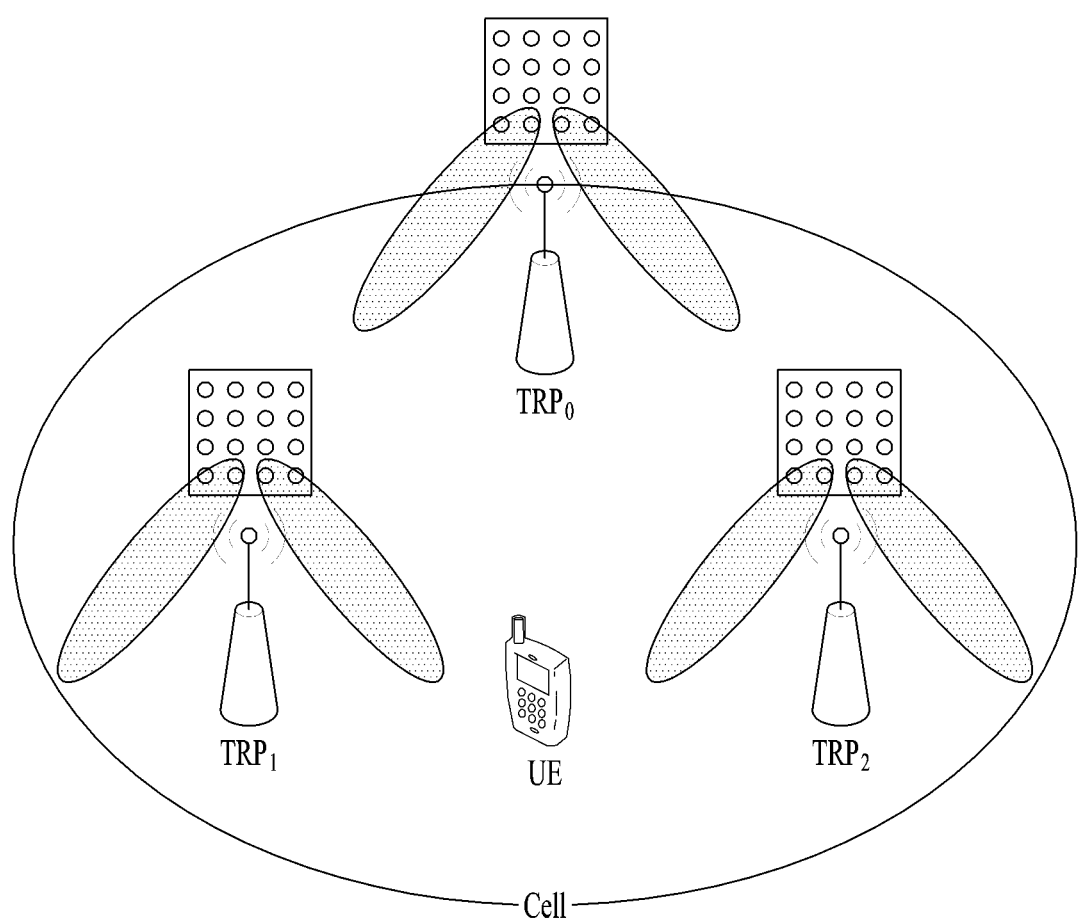
FIG. 8 is a view illustrating an exemplary cell in an NR system.

FIG. 8 is a view illustrating an exemplary cell in the NR system.

Referring to FIG. 8, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system. In the present disclosure, a beam index may be interpreted as an SSB index Hybrid Automatic Repeat and Request (HARQ)

Figure 9:
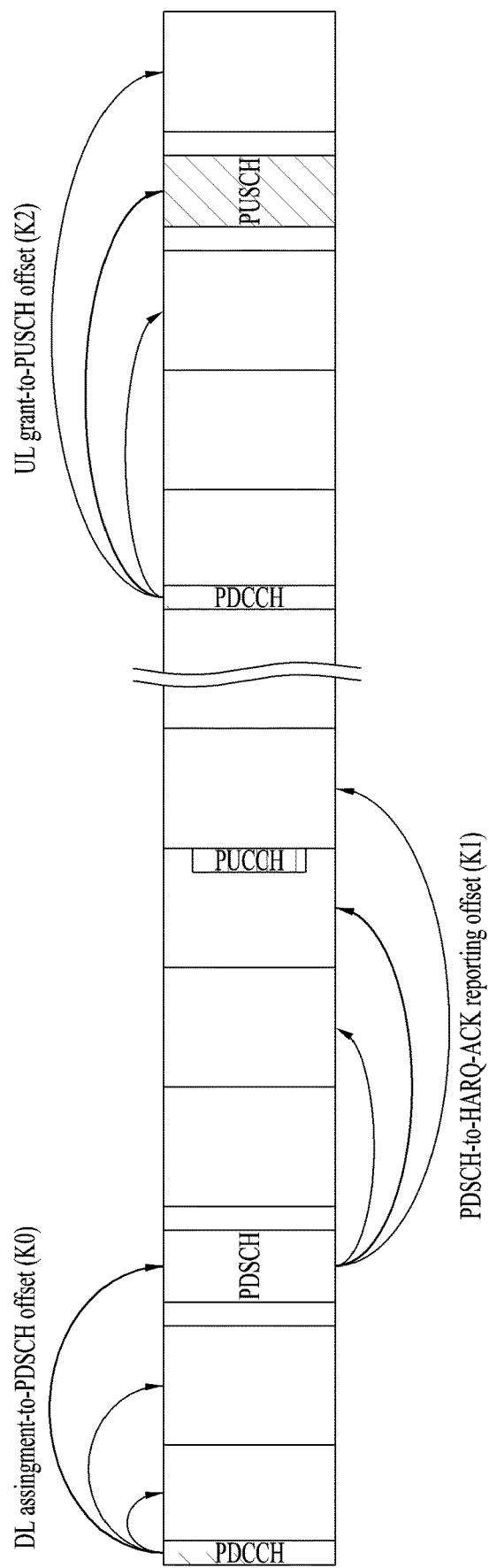
FIG. 9 is a view illustrating a HARQ-ACK timing in an NR system.

In relation to the operation of a UE for reporting control information, a HARQ-ACK operation will now be described. HARQ-ACK is information indicating whether the UE has successfully received a physical DL channel. If the UE has successfully received the physical DL channel, the UE feeds back ACK to the gNB and, otherwise, the UE feeds back NACK to the gNB. In NR, HARQ supports 1-bit HARQ-ACK feedback per transport block. FIG. 9 is a view illustrating an example of a HARQ-ACK timing K1.

In FIG. 9, K0 represents the number of slots from a slot with a PDCCH carrying DL assignment (i.e., DL grant) to a slot with PDSCH transmission corresponding to the PDCCH, K1 represents the number of slots from a slot with a PDSCH to a slot with HARQ-ACK transmission corresponding to the PDSCH, and K2 represents the number of slots from a slot with a PDCCH carrying a UL grant to a slot with PUSCH transmission corresponding to the PDCCH. That is, K0, K1, and K2 may be briefly summarized as shown in Table 3 below.

TABLE 3

| | A | B |
|---|---|---|
| K0 | DL scheduling DCI | Corresponding DL data transmission |
| K1 | DL data reception | Corresponding HARQ-ACK |
| K2 | UL scheduling DCI | Corresponding UL data transmission |

The gNB may provide a HARQ-ACK feedback timing to the UE dynamically by DCI or semi-statically by RRC signaling.

The NR system supports different minimum HARQ processing times for UEs. A HARQ processing time includes delay between a DL data reception timing and a corresponding HARQ-ACK transmission timing and delay between a UL grant reception timing and a corresponding UL data transmission timing. The UE transmits information about the capability of a minimum HARQ processing time thereof to the gNB. From the viewpoint of the UE, HARQ ACK/NACK feedback for a plurality of DL transmissions in the time domain may be transmitted in one UL data/control region. A timing between DL data reception and corresponding ACK is indicated by the DCI.

Unlike the LTE system in which a transport block (TB)-based or codeword-based HARQ procedure is performed, the NR system supports code block group (CBG)-based transmission of single-bit/multi-bit HARQ-ACK feedback. A TB may be mapped to one or more code blocks (CBs) according to the size of the TB. For example, in a channel coding procedure, a cyclic redundancy check (CRC) code is attached to the TB. If a CRC-attached TB is not larger than a certain size, the CRC-attached TB corresponds to one CB. However, if the CRC-attached TB is larger than the certain size, the CRC-attached TB is segmented into a plurality of CBs. In the NR system, the UE may be configured to receive CBG-based transmissions, and retransmission may be scheduled to carry a subset of all CBs of the TB.

CBG-Based HARQ Procedure

In LTE, a TB-based HARQ procedure is supported. In NR, a CBG-based HARQ procedure is supported together with the TB-based HARQ procedure.

Figure 10:
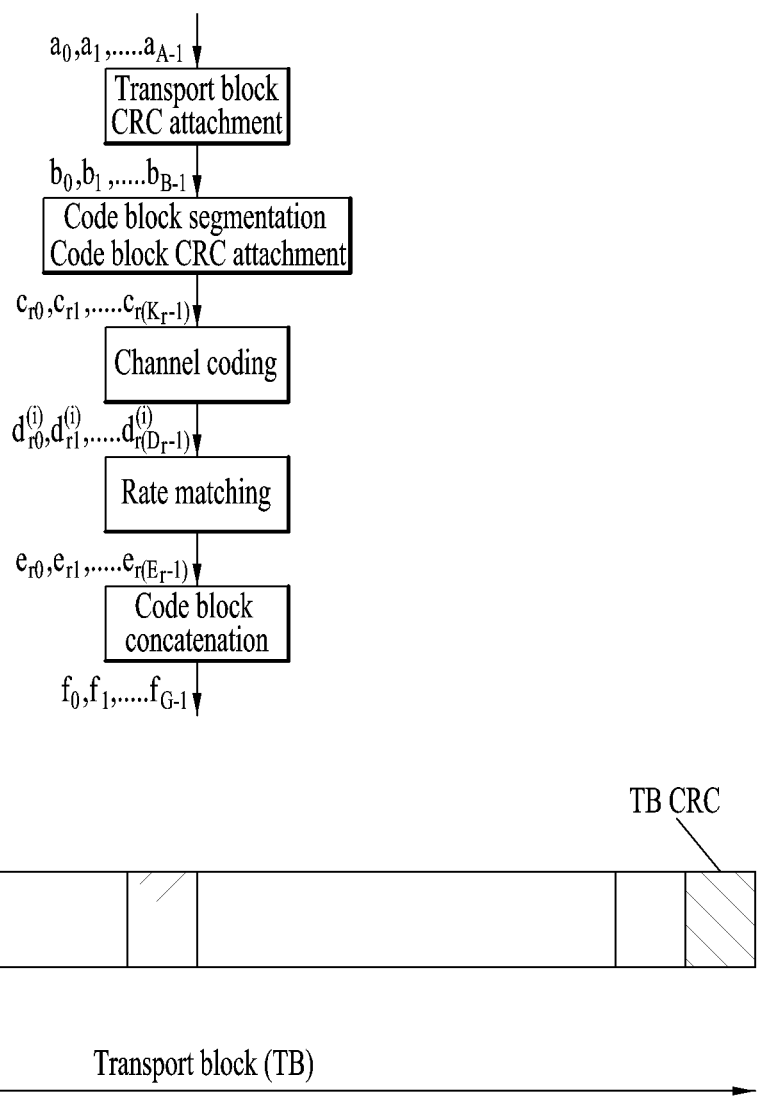
FIGS. 10 and 11 are views illustrating code block group (CBG)-based HARQ-ACK transmission in an NR system.

FIG. 10 illustrates a TB processing procedure and a TB structure. The procedure illustrated in FIG. 10 may be applied to data of transport channels including a DL-SCH, a PCH, and an MCH. A UL TB (or data of a UL transport channel) may also be processed in a similar manner.

Referring to FIG. 10, a transmitter attaches a (e.g., 24-bit) CRC (a TB CRC) to a TB for error check. Thereafter, the transmitter may segment the CRC-attached TB into a plurality of CBs in consideration of the size of a channel encoder. For example, in LTE, a maximum size of a CB is 6144 bits. Accordingly, if a TB size is 6144 bits or less, the CB is not configured and, if the TB size is larger than 6144 bits, the TB is divided into 6144-bit segments to thus configure a plurality of CBs. A (e.g., 24-bit) CRC (CB CRC) is individually attached to each CB for error check. The CBs are concatenated into a codeword after channel coding and rate matching. In the TB-based HARQ procedure, data scheduling and a related HARQ procedure are performed in units of TBs and the CB CRC is used to determine early termination of TB decoding.

Figure 11:
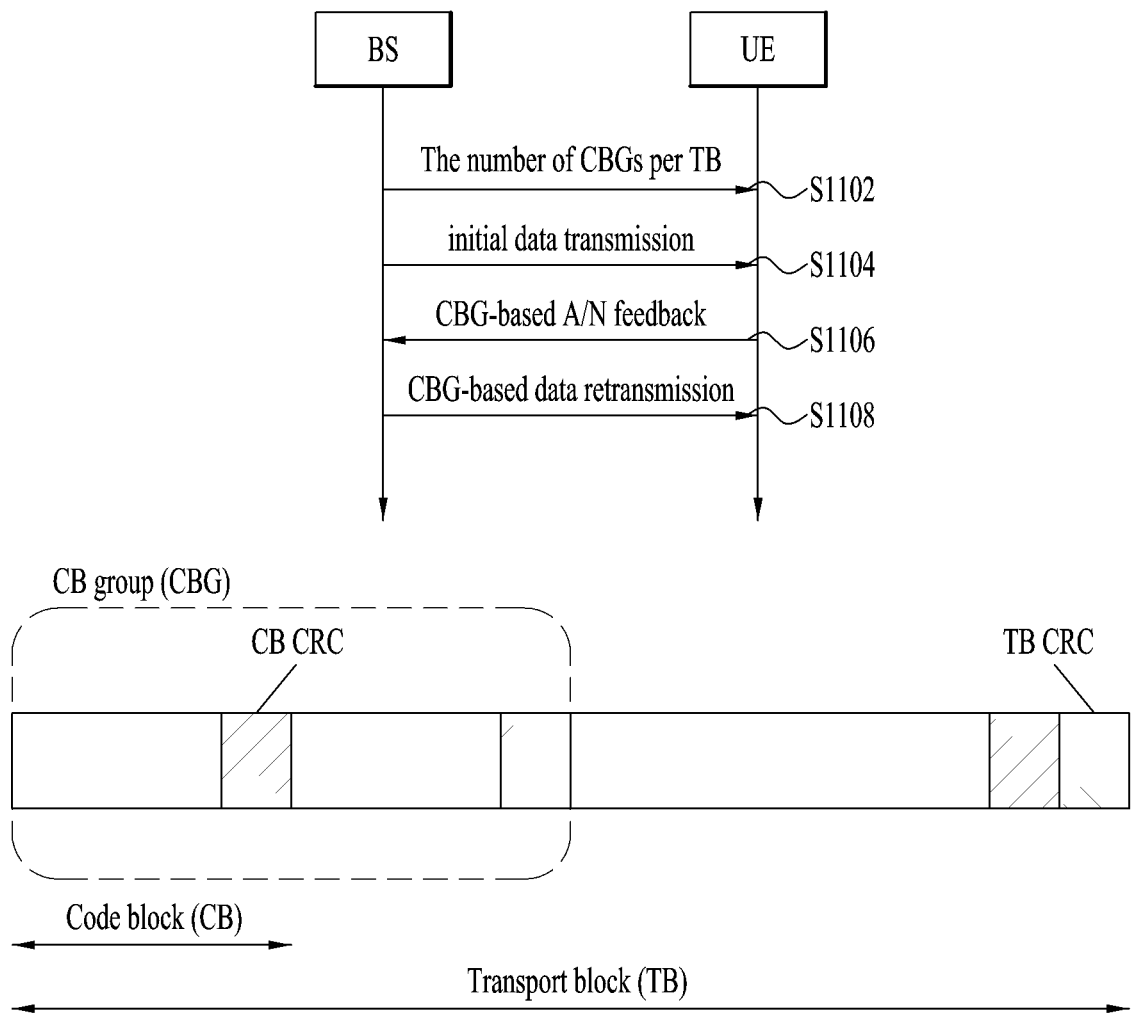

FIG. 11 illustrates a CBG-based HARQ procedure. In the CBG-based HARQ procedure, data scheduling and a related HARQ process may be performed in units of TBs.

Referring to FIG. 11, the UE may receive, from the gNB, information about the number M of CBGs per TB by a higher-layer signal (e.g., an RRC signal) (S1102). The UE may then receive initial data transmission (on a PDSCH) from the gNB (S1104). The data may include a TB, the TB may include a plurality of CBs, and the plural CBs may be divided into one or more CBGs. Some of the CBGs may include ceiling(K/M) CBs and the other CBGs may include flooring (K/M) CBs. K represents the number of CBs in the data. Next, the UE may feed back CBG-based ACK/NACK (A/N) information for the data to the gNB (S1106) and the gNB may perform CBG-based data retransmission (S1108). The A/N information may be transmitted on a PUCCH or a PUSCH. The A/N information may include a plurality of A/N bits for the data and each A/N bit may indicate an A/N response generated on a CBG basis for the data. The payload size of the A/N information may be maintained equal according to M irrespective of the number of CBGs constituting the data.

Dynamic/Semi-Static HARQ-ACK Codebook Scheme

In NR, a dynamic HARQ-ACK codebook scheme and a semi-static HARQ-ACK codebook scheme are supported. A HARQ-ACK (or A/N) codebook may be replaced with a HARQ-ACK payload.

If the dynamic HARQ-ACK codebook scheme is configured, the size of the A/N payload varies with the number of actually scheduled DL data. For this purpose, a PDCCH related to DL scheduling includes a counter-downlink assignment index (counter-DAI) and a total-DAI. The counter-DAI indicates a {CC, slot} scheduling order value calculated in a component carrier (CC)-first manner (or a cell-first manner) and is used to determine the positions of A/N bits in the A/N codebook. The total-DAI indicates a slot-based scheduling accumulative value of up to a current slot and is used to determine the size of the A/N codebook.

If the semi-static A/N codebook scheme is configured, the size of the A/N codebook is fixed (to a maximum value) irrespective of the number of actually scheduled DL data. Specifically, (the maximum size of) an A/N payload transmitted on one PUCCH in one slot may be determined to be the number of A/N bits corresponding to a combination (hereinafter, a bundling window) of all CCs configured for the UE and all DL scheduling slots (or PDSCH transmission slots or PDCCH monitoring slots) for which an A/N transmission timing may be indicated. For example, DL grant DCI (a PDCCH) may include PDSCH-to-A/N timing information and the PDSCH-to-A/N timing information may have one (e.g., k) of a plurality of values. For example, if a PDSCH is received in slot #m and PDSCH-to-A/N timing information in the DL grant DCI (the PDCCH) that schedules the PDSCH indicates k, A/N information for the PDSCH may be transmitted in slot #(m+k). For example, k∈{1, 2, 3, 4, 5, 6, 7, 8}. If A/N information is transmitted in slot #n, the A/N information may include an allowed maximum number of A/Ns based on a bundling window. That is, the A/N information in slot #n may include an A/N corresponding to slot #(n−k). For example, if k∈{1, 2, 3, 4, 5, 6, 7, 8}, the A/N information in slot #n includes A/Ns corresponding to slot #(n−8) to slot #(n−1) (i.e., a maximum number of A/Ns) irrespective of actual DL data reception. Here, the A/N information may be replaced with the A/N codebook or the A/N payload. Further, a slot may be understood as/replaced with a candidate occasion for DL data reception. As in the above example, a bundling window may be determined according to a PDSCH-to-A/N timing based on an A/N slot, and a PDSCH-to-A/N timing set may have predefined values (e.g., {1, 2, 3, 4, 5, 6, 7, 8}) or may be configured by higher-layer (RRC) signaling.

Now, a description will be given of a method of transmitting and receiving HARQ-ACK according to embodiments of the present disclosure.

The next generation communication system considers support of a service having requirements of low latency and/or high reliability compared to other services. An example of such a service may include an ultra-reliability low-latency communication (URLLC) service. In this case, a packet size for the URLLC service is a few bytes. Various packet sizes may be considered from a small packet size up to a large packet size of thousands or tens of thousands of bytes such as a packet size for video transmission. For example, for a service that supports a task such as telemedicine or remote control, a packet size to a degree sufficient to transmit and receive video having an appropriate level of quality in real time may be considered.

According to the type of information transmitted and received, such as text, voice, or video, reliability requirements may differ between different information. Here, the reliability requirements may be reliability requirements for received information or for received quality of service. In addition, the different information may be included in different packets or in one packet. For example, in the next-generation communication system, a scalable video codec (SVC) may be used for real-time video transmission. In this case, a high-quality video such as high definition (HD) or ultra-high definition (UHD) may be generated and/or configured as a combination of a relatively low-quality video such as standard definition (SD) and side information.

In this case, a receiver may distinguishably receive the SD-level video and the side information, thereby preventing a service from being disconnected depending on channel quality or on whether or not the side information is received. However, the quality of the video may also be different depending on the channel quality and/or on whether the side information is received. In other words, if the receiver receives low-quality video and high-quality video containing the side information and decodes only the low-quality video, the quality of the videos will be lowered. However, if channel quality is poor, a service may be prevented from being disconnected. In contrast, if channel quality is good, the receiver may provide high-quality video to a user by decoding both the low-quality video and the side information.

In an embodiment of the present disclosure, for convenience of description, information expected to be successful in transmission and reception in terms of service provision is referred to as major information, and information for which transmission/reception failure is tolerated in terms of service provision is referred to as side information. In other words, in the above example, low-quality video such as SD video, which is necessary for video playback, may be referred to as the major information, and side information needed to generate high-quality video such as HD or UHD video using low-quality video may be referred to as the side information for which transmission and reception failure is tolerated.

Although a description of the present disclosure will be given focusing on a method of transmitting a signal by the BS and receiving the signal by the UE, this is only one embodiment and it is obvious that the idea of the present disclosure is applied even to an environment in which the UE transmits a signal and the BS receives the signal.

When the major information and the side information are simultaneously present in a single TB without distinguishment therebetween, if a decoding error such as a bit error is actually generated only in the side information, retransmission of the major information, which is transmitted together with the side information, may be unnecessary. Distinguishment between the major information and side information in a MAC layer after ACK for a TB is determined in a physical layer may be ineffective or less effective in terms of latency.

Accordingly, even when NACK for the TB is configured, an operation of determining whether or not a message in the MAC layer has been successfully received may be introduced. This operation of determining whether or not the message in the MAC layer has been successfully received may be configured by a higher layer.

If the major information and the side information may be distinguished in units of TBs, a scheduler may perform a different handling operation such as determination as to whether or not a new TB or packet is received and/or whether or not a new TB or packet is retransmitted, depending on whether the corresponding TB includes the major information or the side information.

However, when the major information and the side information are distinguished in the MAC layer, since the UE is unaware of whether information included in a related TB is the major information or the side information until decoding for the TB is successful (i.e., CRC is passed), the UE may need to decode all TBs.

However, if the UE decodes all TBs, a latency issue about a related service may occur. Therefore, if whether information included in a TB is the major information or the side information is capable of being determined in the physical layer, decoding may be stopped or skipped with respect to the side information.

In this case, if specific HARQ-ACK needs to be dropped or a HARQ-ACK size needs to be reduced through HARQ-ACK bundling, HARQ-ACK transmission may be performed based on ACK/NACK information of the major information. For example, even when a computational operation for HARQ-ACK bundling is set to an AND operation, if HARQ-ACK of the major information is ACK, HARQ-ACK transmission may be performed by unconditionally processing HARQ-ACK as ACK.

In addition, when modulation and coding scheme (MCS) tables having different block error rate (BLER) requirements for the major information and the side information are supported, the MCS tables may be dynamically changed in order to support different MCS tables for the major information and the side information.

Embodiments below describe a method of distinguishing between the major information and the side information in the physical layer, a decoding priority according to the type of related information, and a method of transmitting HARQ-ACK.

Figure 12:
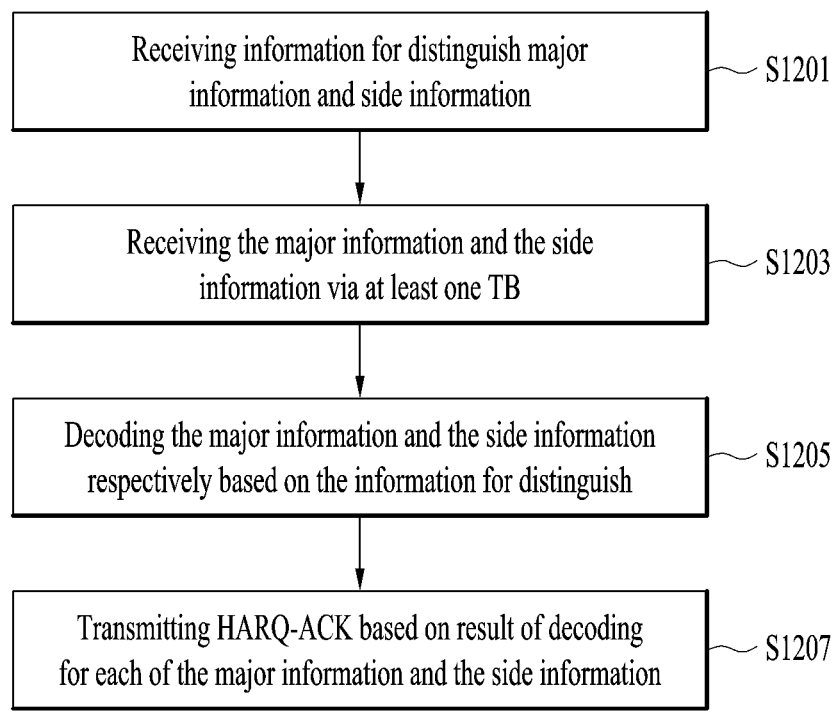
FIGS. 12 to 14 are flowcharts illustrating operation processes in terms of a UE, a BS, and a network according to an embodiment of the present disclosure.

FIG. 12 is a flowchart illustrating an operation process of a UE according to embodiments described below. Referring to FIG. 12, the UE may receive information for distinguishing between major information and side information (S1201). In this case, the information may be received by higher layer signaling and/or physical layer signaling. Specifically, through which information the major information and the side information may be distinguished may conform to embodiments described later.

Upon receiving the information, the UE may receive the major information and the side information included in at least one TB based on the received information (S1203) and decode each of the major information and the side information included in the at least one TB, based on the information for distinguishing between the major information and the side information (S1205). The UE may transmit HARQ-ACK for each of the major information and the side information to the BS based on a decoding result (S1207). In this case, a detailed method for the UE to transmit HARQ-ACK to the BS based on the decoding result may conform to embodiments described later.

Figure 13:
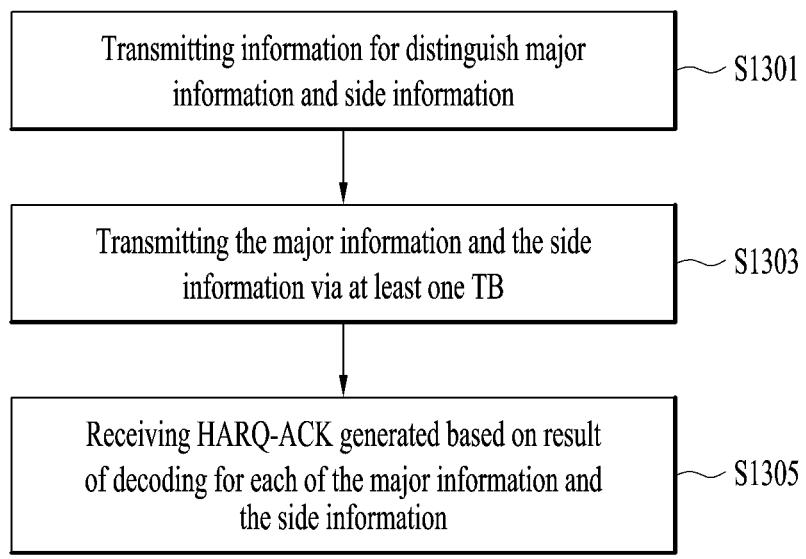

An overall operation process of the BS according to embodiments of the present disclosure will now be described with reference to FIG. 13. Referring to FIG. 13, the BS may transmit information for distinguishing between major information and side information to the UE (S1301). In this case, the information may be transmitted by higher layer signaling and/or physical layer signaling. Specifically, through which information the major information and the side information is distinguished may conform to embodiments described later.

The BS may transmit the major information and the side information by being included in at least one TB based on the transmitted information (S1303). Next, the BS may receive HARQ-ACK for each of the major information and the side information from the UE. In this case, HARQ-ACK may be generated based on a decoding result of decoding each of the major information and the side information based on the information for distinguishing between the major information and the side information (S1305). A detailed method of generating HARQ-ACK received by the BS based on the decoding result may conform to embodiments described later.

Figure 14:
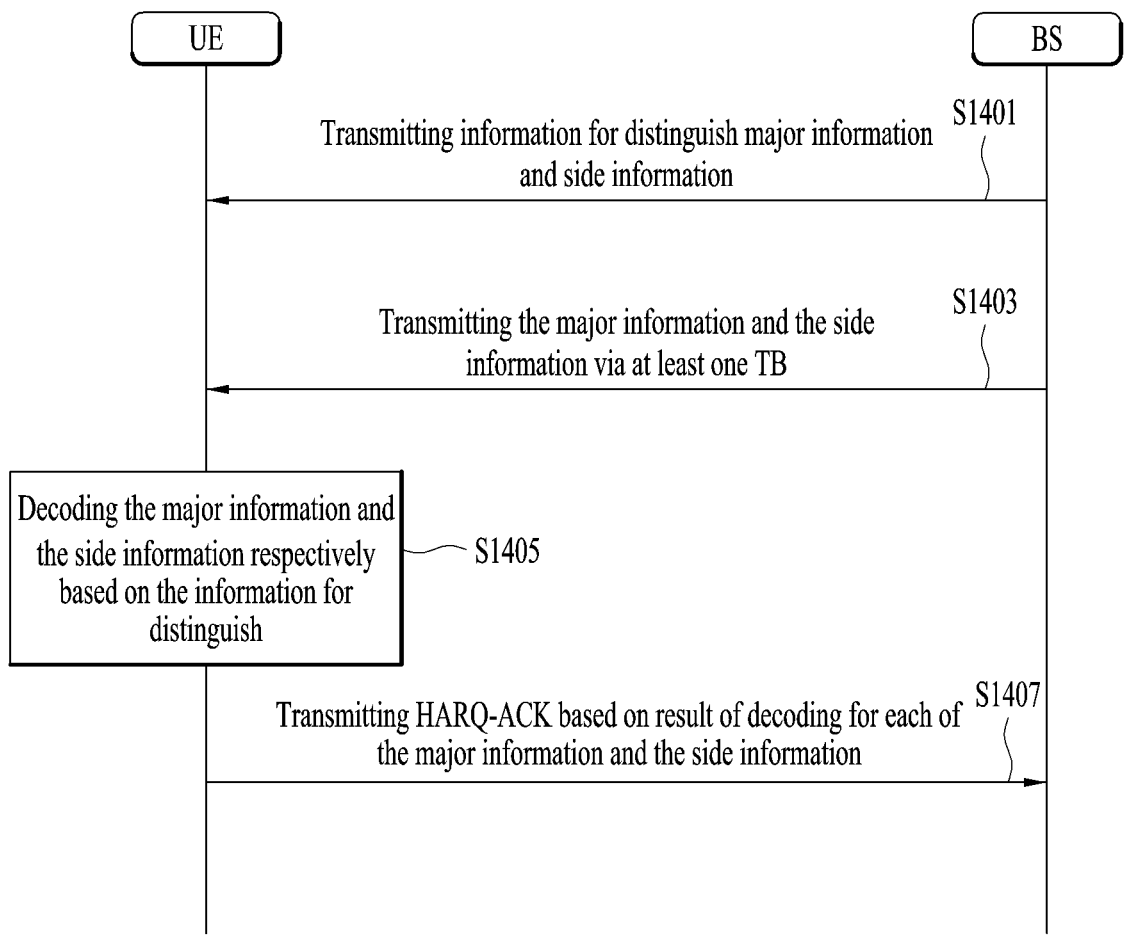

An overall operation according to embodiments described later will now be described in terms of a network with reference to FIG. 14. Referring to FIG. 14, the BS may transmit information for distinguishing between major information and side information to the UE (S1401). In this case, the information may be transmitted by higher layer signaling and/or physical layer signaling. Specifically, through which information the major information and the side information may be distinguished may conform to embodiments described later.

The BS may transmit the major information and the side information by being included in at least one TB based on the transmitted information (S1403). Upon receiving the major information and the side information, the UE may decode each of the major information and the side information, included in the at least one TB, based on the information for distinguishing between the major information and the side information (S1405). The UE may then transmit HARQ-ACK for each of the major information and the side information to the BS based on a decoding result (S1407). A detailed method for the UE to generate and/or transmit HARQ-ACK to the BS may conform to embodiments described later.

A method of distinguishing between the major information and the side information according to an embodiment of the present disclosure will now be described.

The major information and the side information may be distinguished in units of TBs. For example, TB A may correspond to the major information and TB B may correspond to side information so that the major information and the side information may be transmitted on different PDSCHs. Alternatively, different types of side information may be transmitted on the same PDSCH but through different codewords or different TBs, in consideration of a multiple-input multiple-output (MIMO) operation. Basically, the major information may be information that should be successfully transmitted/received in order to determine the success of packet transmission/reception. In contrast, the side information may be irrelevant to determining the success of packet transmission/reception for the purpose of improving the quality of service.

A method of distinguishing between the major information and the side information will now be described. The major information and the side information may be distinguished based on a HARQ process ID. Specifically, the maximum and/or minimum value of HARQ process numbers through which the major information may be transmitted may be configured by higher layer signaling or by a predefined method, or a set of HARQ process numbers through which the major information may be transmitted may be designated and/or configured. HARQ process numbers other than the configured or designated HARQ process numbers may be assumed to be HARQ process numbers through which the side information may be transmitted.

However, similar to specifying the HARQ process numbers for the major information, the minimum and/or maximum value of the HARQ process number even for the side information may be designated or a set of HARQ process numbers through which the side information may be transmitted may be designated and/or configured. Specifically, the maximum number of retransmissions for the set of the HARQ process numbers corresponding to the major information and the maximum number of retransmissions for the set of the HARQ process numbers corresponding to the side information may be different and may be independently configured. For example, a relatively larger number of retransmissions may be allowed for the major information than for the side information.

Meanwhile, the major information and the side information may be distinguished through a DCI indication. Specifically, the major information and the side information may be distinguished by a specific field in the DCI or by a combination of values included in fields.

The major information and the side information may be distinguished based on CRC masking. Specifically, CRC masking may be performed such that a major information/side information indicator is additionally scrambled to a CRC for DCI by a radio network temporary identifier (RNTI). In this case, the major information/side information indicator may use CRC sequence bits that are not scrambled by the RNTI. For example, if the CRC is 24 bits in length and the RNTI is 16 bits, then 8 (=24-16) bits are a part that is not CRC-masked by the RNTI and whether corresponding information is the major information or the side information may be indicated using 8 bits or parts of the 8 bits. That is, whether the corresponding information is the major information or the side information may be indicated through parts corresponding to the 8 bits or a subset of the parts.

In addition, with respect to at least the same HARQ process number, it may be assumed that the major information and the side information correspond to the same packet.

In this case, HARQ-ACK may be generated only for the major information and HARQ-ACK may not be generated for the side information or may be set to discontinuous transmission (DTX). Alternatively, in order to increase detection performance for the side information, HARQ-ACK for the side information may be generated by a higher layer. In this case, HARQ-ACK for a plurality of TBs based on the same HARQ process number may be generated and/or transmitted. In particular, this example may be performed in the same manner even when a non-MIMO operation of 4 layers or more is performed.

The major information and the side information, having the same HARQ process number, may be extended to a HARQ process number group as an embodiment corresponding to the same packet. In this case, information about the HARQ process number group may be configured by a higher layer.

When the major information and the side information are distinguished in units of TBs, the UE may delay or skip decoding for a specific TB according to scheduling, capability, and/or latency requirements. A TB corresponding to the major information has a higher priority than a TB corresponding to the side information, so that the TB corresponding to the major information may be preferentially decoded.

HARQ-ACK information for the major information may also be preferentially generated and/or transmitted and HARQ-ACK information for the side information may be omitted. Specifically, when it may be assumed that the major information and the side information correspond to the same packet, the HARQ-ACK information for the side information, that is, a HARQ-ACK value for the side information, may be differently processed according to the HARQ-ACK information for the major information. For example, if the HARQ-ACK information for the major information is ACK, the HARQ-ACK information for the side information may be generated and transmitted. Conversely, if the HARQ-ACK information for the major information is NACK, since reception of the side information may not be meaningful, the HARQ-ACK information for the side information may be skipped or processed as DTX. However, although the HARQ-ACK information for the side information has been processed as DTX, if HARQ-ACK for the side information may be transmitted due to HARQ-ACK transmission for another TB, etc., DTX for the side information may again be changed to ACK or NACK according to a decoding result of the side information. In other words, when the HARQ-ACK information for the major information is NACK, a bit corresponding to the HARQ-ACK information for the side information is empty in HARQ-ACK and, when HARQ-ACK for another TB is transmitted, the bit may be changed to ACK or NACK according to a decoding result of the HARQ-ACK information for the side information and then may be transmitted.

Meanwhile, even if the major information and the side information correspond to the same TB, the major information and the side information may be distinguished by different CBs or CBGs. Specifically, when one TB is composed of a plurality of CBs, one or more CBs or CBGs may correspond to the major information, and the remaining CBs or CBGs may correspond to the side information. In this case, even when a TB size is smaller than a certain level, the number of CBs or CBGs constituting the TB may be plural. The number of CBs or CBGs included in the TB may be set by higher layer signaling.

Alternatively, as a method for linking the TB size with the number of CBs or CBGs, the minimum value of the number of CBs or CBGs constituting the TB may be set by a higher layer. Alternatively, a scaling factor may be set. If the number of CBs or CBGs for a specific TB size is N, the number of final CBs or CBGs included in a corresponding TB may be determined to be the product of the scaling factor and N.

Information about CBs or CBGs corresponding to the major information and/or information about CBs or CBGs corresponding to the side information may be configured by higher layer signaling. In this case, if the number of CBs or CBGs constituting a TB is flexibly changed, unnecessary dummy bits may be added. Accordingly, in order to prevent the unnecessary dummy bits from being added, the information about the CBs or CBGs corresponding to the major information and the information about the CBs or CBGs corresponding to the side information may be indicated by DCI.

For example, CRC masking and/or a separate field may indicate the number of CBs or CBGs corresponding to the major information. Then, upon receiving the number of CBs or CBGs corresponding to the major information, the UE may interpret that CBs or CBGs of the first front part corresponding to the received number of CBs or CBGs from the total number of CBs or CBGs constituting a TB correspond to the major information and the remaining CBs or CBGs correspond to the side information.

However, the above-described embodiments are purely exemplary embodiments and it is apparent that the embodiments may be extended to other embodiments. For example, if the ratio of the number of CBs or CBGs corresponding to the major information and/or the side information is transmitted to the UE through DCI, etc., the UE may identify CBs or CBGs constituting a TB according to the ratio and interpret CBs or CBGs corresponding to the major information and CBs or CBGs corresponding to the side information.

To facilitate setting of a TB size, it may be assumed that the size of CBs corresponding to the major information is the same as the size of CBs corresponding to the side information. In this case, if the size of CBs corresponding to the major information is different from the size of CBs corresponding to the side information, dummy bits may be added or zero padding may be performed. For example, the size of CBs may be configured according to information having a larger size among the major information and the side information. CBs corresponding to information having a smaller size is filled with bits according to the configured size. The remaining bits are filled with dummy bits or zero padding may be performed with respect thereto.

According to higher layer configuration, HARQ-ACK may be generated as 1 bit per TB or may be generated as 1 bit per CB.

In this case, TB-based HARQ-ACK feedback may be generated based on whether CRC for CBs or CBGs corresponding to the major information is successful. For example, even when CRC fails in some of CBs corresponding to the side information, if CRC for all CBs corresponding to the major information is successful, ACK may be configured for a corresponding TB. Conversely, even when CRC for all CBs corresponding to the side information is successful, if CRC fails in some of CBs corresponding to the major information, NACK may be configured for the corresponding TB.

When CBG-based HARQ-ACK feedback is configured in a higher layer, HARQ-ACK information may be generated for CBs corresponding to each of the major information and the side information.

In the next-generation communication system, outer coding may be introduced as part of a method for improving detection performance. Outer coding refers to primarily performing encoding on a CB or a CBG and secondarily performing encoding on the encoded CB or CBG. In this case, a CBG in the primary encoding and a CBG in the secondary encoding may be different.

When performing such outer coding, the above-described embodiments may be applied only to a TB, a CB, or a CBG corresponding to the major information. This serves to concentrate available resources on an important part for successful decoding included in a packet.

Figure 15:
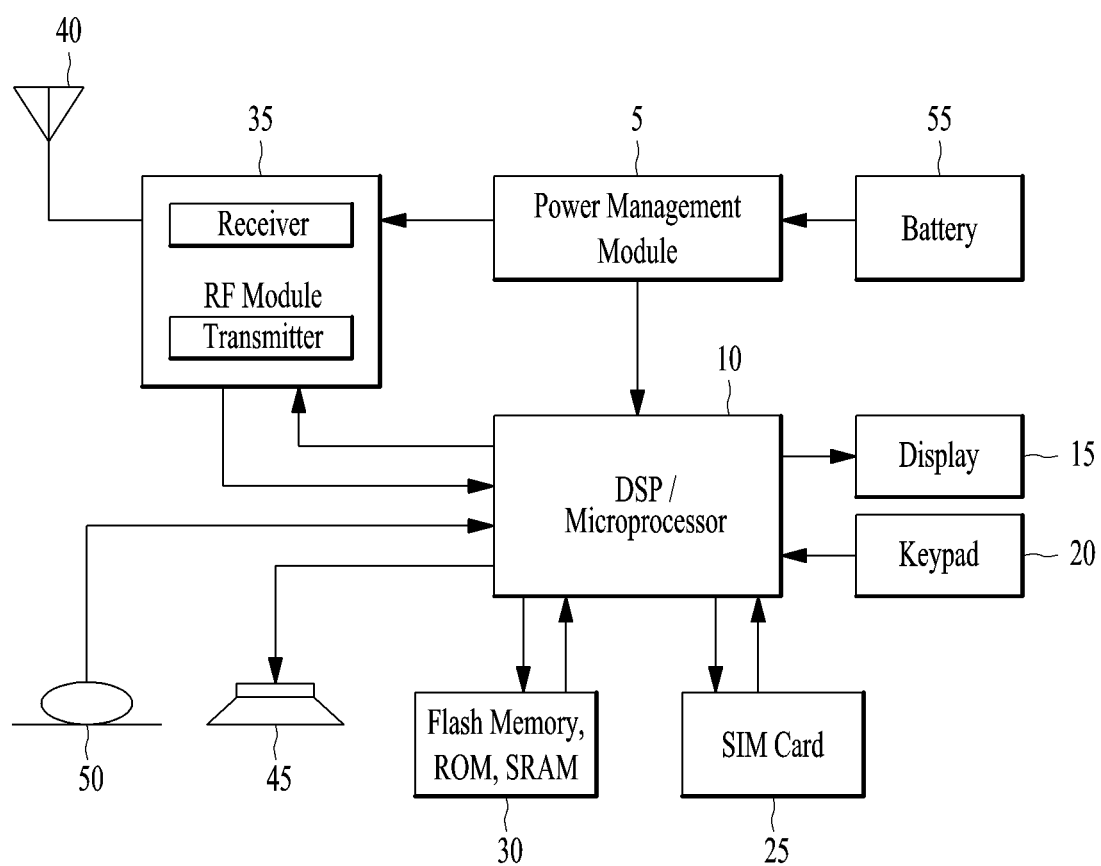
FIG. 15 is a block diagram of components of a wireless device for implementing the present disclosure.

FIG. 15 illustrates an embodiment of a wireless communication device according to an embodiment of the present disclosure.

The wireless communication device described with reference to FIG. 15 may represent the UE and/or the BS according to an embodiment of the present disclosure. However, the wireless communication device of FIG. 15 is not necessarily limited to the UE and/or the BS according to the present embodiment and may be replaced by various devices such as a vehicle communication system or device, a wearable device, a laptop, a smartphone, etc.

Referring to FIG. 15, the UE and/or the BS according to an embodiment of the present disclosure includes at least one processor 10 such as a digital signal processor (DSP) or a microprocessor, a transceiver 35, and a power management module 5, an antenna 40, a battery 55, a display 15, a keypad 20, a memory 30, a subscriber identification module (SIM) card (25), a speaker 45, and a microphone 50. The UE and/or the BS may also include a single antenna or multiple antennas. The transceiver 35 may also be referred to as a radio frequency (RF) module.

The processor 10 may be configured to implement the functions, procedures and/or methods described with reference to FIGS. 1 to 14. In at least some of the embodiments described with reference to FIGS. 1 to 14, the processor 10 may implement one or more protocols, such as layers of a radio interface protocol (e.g., functional layers).

The memory 30 is connected to the processor 10 and stores information related to the operation of the processor 10. The memory 30 may be located inside or outside the processor 10 and may be connected to the processor through a variety of techniques, such as wired or wireless communication.

The user may input various types of information (e.g., instruction information such as a phone number) by various techniques such as pressing a button on the keypad 20 or activating a voice mode using the microphone 50. The processor 10 performs appropriate functions, such as receiving and/or processing information of the user and dialing a telephone number.

To perform appropriate functions, data (e.g., operation data) may be retrieved from the SIM card 25 or the memory 30. In addition, the processor 10 may receive and process global positioning system (GPS) information from a GPS chip to obtain location information of the UE and/or the BS, such as vehicle navigation and a map service, or perform functions related to the location information. The processor 10 may display various types of information and data on the display 15 for reference and convenience of the user.

The transceiver 35 is connected to the processor 10 to transmit and/or receive a radio signal such as an RF signal. In this case, the processor 10 may control the transceiver 35 to initiate communication and transmit a radio signal including various types of information or data such as voice communication data. The transceiver 35 may include a receiver for receiving the radio signal and a transmitter for transmitting the radio signal. The antenna 40 facilitates transmission and reception of the radio signal. In some embodiments, upon receiving the radio signal, the transceiver 35 may forward the radio signal and convert the radio signal to a baseband frequency signal for processing by the processor 10. The processed signal may be processed according to various techniques, such as conversion into audible or readable information and then may be output through the speaker 45.

In some embodiments, a sensor may also be connected to the processor 10. The sensor may include one or more sensing devices configured to detect various types of information, including velocity, acceleration, light, and vibration. The processor 10 may receive and process sensor information obtained from the sensor, such as proximity, location, and images, so that various functions including collision avoidance and autonomous driving may be performed.

Various components such as a camera and a USB port may be additionally included in the UE and/or the BS. For example, the camera may be additionally connected to the processor 10 and may be used for various services such as autonomous driving and vehicle safety services.

In this way, FIG. 15 illustrate purely one embodiment of components constituting the UE and/or the BS and the present disclosure is not limited thereto. For example, some components, such as the keypad 20, a GPS chip, a sensor, the speaker 45, and/or the microphone 50, may be excluded for implementation of the UE and/or the BS in some embodiments.

Specifically, in order to implement the embodiments of the present disclosure, an operation when the wireless communication device illustrated in FIG. 15 is the UE according to an embodiment of the present disclosure will be described. When the wireless communication device is the UE according to an embodiment of the present disclosure, the processor 10 may control the transceiver 35 to receive information for distinguishing between major information and side information. In this case, the information may be received by higher layer signaling and/or physical layer signaling. Specifically, through which information the major information and the side information may be distinguished may conform to the embodiments of the present disclosure described based on FIGS. 1 to 14.

Upon receiving the information, the processor 10 may control the transceiver 35 to receive the major information and the side information included in at least one TB based on the received information and decode each of the major information and the side information included in at least one TB based on the information for distinguishing between the major information and the side information. The UE may control the transceiver 35 to transmit HARQ-ACK for the major information and the side information to the BS based on a decoding result. In this case, a detailed method of transmitting HARQ-ACK to the BS by the processor 10 based on the decoding result may conform to the embodiments of the present disclosure described based on FIGS. 1 to 14.

In order to implement the embodiments of the present disclosure, when the wireless communication device illustrated in FIG. 15 is the BS according to an embodiment of the present disclosure, the processor 10 may control the transceiver 35 to transmit information for distinguishing between the major information and the side information to the UE. In this case, the information may be transmitted by higher layer signaling and/or physical layer signaling. Specifically, which information may be transmitted to distinguish between the major information and the side information may conform to the embodiments of the present disclosure described based on FIGS. 1 to 14.

The processor 10 may control the transceiver 35 to transmit the major information and side information by being included in at least one TB based on the transmitted information. Thereafter, the processor 10 may control the transceiver 35 to receive HARQ-ACK for the major information and the side information from the UE. In this case, HARQ-ACK may be generated based on a decoding result obtained by decoding each of the major information and the side information based on the information for distinguishing between the major information and the side information. A detailed method of generating HARQ-ACK received by the BS based on the decoding result may conform to the embodiments of the present disclosure described with reference to FIGS. 1 to 14.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or gNB)', 'Access Point (AP)', etc.

The embodiments of the present disclosure may be achieved by various means, for example, hardware, firmware, software, or a combination thereof. In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the above-described method of transmitting and receiving a HARQ-ACK signal and the apparatus therefor have been described in the context of an example applied to the 5G NR system, the embodiments are applicable to various wireless communication systems in addition to the 5G NR system.

The invention claimed is:

1. A method of transmitting a hybrid automatic repeat request (HARQ) feedback signal by a user equipment (UE) in a wireless communication system, the method comprising:
   reporting capability information related to a processing timing of the UE;
   receiving control information for distinguishing between first information and second information;
   receiving a physical downlink control channel (PDCCH) scheduling a physical downlink shared channel (PDSCH), wherein the PDCCH includes configuration information related to the HARQ feedback signal;
   receiving the PDSCH including one transport block (TB) including the first information and the second information based on the PDCCH;
   decoding the PDSCH based on the control information; and
   transmitting the HARQ feedback signal including HARQ information for the one TB based on a decoding result for each of the first information and second information,
   wherein the HARQ information is an acknowledgement (ACK) or a negative acknowledgement (NACK),
   wherein the configuration information includes a time offset for determining a timing at which the HARQ feedback signal is transmitted from a reception timing of the PDSCH, and
   wherein, based on a reliability requirement of the first information being higher than the reliability requirement of the second information, whether the HARQ information is the ACK or the NACK is determined based on the decoding result for the first information regardless of the decoding result for the second information.

2. The method of claim 1, wherein the first information and the second information are distinguished based on a HARQ process identifier (ID) included in the control information.

3. The method of claim 1, wherein the first information and the second information are distinguished based on cyclic redundancy check (CRC) masking included in the control information.

4. The method of claim 1, wherein, based the decoding result for the first information being a decoding success, the HARQ information is the ACK even if the decoding result of the second information is a decoding failure.

5. The method of claim 1, wherein, based on the decoding result for the first information being a decoding failure, the HARQ information is the NACK even if the decoding result of the second information is a decoding success.

6. The method of claim 1,
   further comprising receiving information about the number of code blocks for the first information among a plurality of code blocks included in the one TB,
   wherein code blocks located at a front part of the one TB, corresponding to the number of the code blocks, among the plurality of code blocks are for the first information and remaining code blocks are for the second information.

7. An apparatus for transmitting a hybrid automatic repeat request (HARQ) feedback signal in a wireless communication system, the apparatus comprising:
   at least one processor; and
   at least one memory coupled to the at least one processor and storing instructions that, when executed by the at least one processor, perform operations comprising:
   reporting capability information related to a processing timing of the apparatus,
   receiving control information for distinguishing between first information and second information,
   receiving a physical downlink control channel (PDCCH) scheduling a physical downlink shared channel (PDSCH), wherein the PDCCH includes configuration information related to the HARQ feedback signal,
   receiving the PDSCH including one transport block (TB) including the first information and the second information based on the PDCCH,
   decoding the PDSCH based on the control information, and
   transmitting the HARQ feedback signal including HARQ information for the one TB based on a decoding result for each of the first information and the second information,
   wherein the HARQ information is an acknowledgement (ACK) or a negative acknowledgement (NACK),
   wherein the configuration information includes a time offset for determining a timing at which the HARQ feedback signal is transmitted from a reception timing of the PDSCH, and
   wherein, based on a reliability requirement of the first information being higher than the reliability requirement of the second information, whether the HARQ information is the ACK or the NACK is determined based on the decoding result for the first information regardless of the decoding result for the second information.

8. A method of receiving a hybrid automatic repeat request (HARQ) feedback signal by a base station (BS) in a wireless communication system, the method comprising:
   receiving capability information related to a processing timing of a user equipment (UE);
   transmitting control information for distinguishing between first information and second information;
   transmitting a physical downlink control channel (PDCCH) scheduling a physical downlink shared channel (PDSCH), wherein the PDCCH includes configuration information related to the HARQ feedback signal;
   transmitting the PDSCH including one transport block (TB) including the first information and the second information based on the PDCCH; and
   receiving the HARQ feedback signal including HARQ information for the one TB,
   wherein the HARQ information is an acknowledgement (ACK) or a negative acknowledgement (NACK),
   wherein the configuration information includes a time offset for determining a timing at which the HARQ feedback signal is transmitted from a reception timing of the PDSCH, and
   wherein, based on a reliability requirement of the first information being higher than the reliability requirement of the second information, whether the HARQ information is the ACK or the NACK is determined based on the decoding result for the first information regardless of the decoding result for the second information.

9. A user equipment (UE) for transmitting a hybrid automatic repeat request (HARQ) feedback signal in a wireless communication system, the UE comprising:
- a transceiver;
- at least one processor; and
- at least one memory coupled to the at least one processor and storing instructions that, when executed by the at least one processor, perform operations comprising:
- reporting, through the transceiver, capability information related to a processing timing of the UE:
- receiving, through the transceiver, control information for distinguishing between first information and second information,
- receiving, through the transceiver, a physical downlink control channel (PDCCH) scheduling a physical downlink shared channel (PDSCH), wherein the PDCCH includes configuration information related to the HARQ feedback signal,
- receiving, through the transceiver, the PDSCH including one transport block (TB) including the first information and the second information based on the PDCCH,
- decoding the PDSCH based on the control information, and
- transmitting, through the transceiver, the HARQ feedback signal including HARQ information for the one TB based on a decoding result for each of the first information and the second information,
- wherein the HARQ information is an or a negative acknowledgement (NACK),
- wherein the configuration information includes a time offset for determining a timing at which the HARQ feedback signal is transmitted from a reception timing of the PDSCH, and
- wherein, based on a reliability requirement of the first information being higher than the reliability requirement of the second information, whether the HARQ information is the ACK or the NACK is determined based on the decoding result for the first information regardless of the decoding result for the second information.

10. A base station (BS) for receiving a hybrid automatic repeat request (HARQ) feedback signal in a wireless communication system, the BS comprising:
- a transceiver;
- at least one processor; and
- at least one memory coupled to wherein the at least one processor and storing instructions that, when executed by the at least one processor, perform operations comprising:
- receiving, through the transceiver, capability information related to a processing timing of a user equipment (UE),
- transmitting, through the transceiver, control information for distinguishing between first information and second information,
- transmitting, through the transceiver, a physical downlink control channel (PDCCH) scheduling a physical downlink shared channel (PDSCH), wherein the PDCCH includes configuration information related to the HARQ feedback signal,
- transmitting, through the transceiver, the PDSCH including the first information and the second information based on the PDCCH, and
- receiving, through the transceiver, the HARQ feedback signal including HARQ information for an or a negative acknowledgement (NACK),
- wherein the configuration information includes a time offset for determining a timing at which the HARQ feedback signal is transmitted from a reception timing of the PDSCH,
- wherein the first information and the second information are included in one transport block (TB), and
- wherein, based on a reliability requirement of the first information being higher than the reliability requirement of the second information, whether the HARQ information is the ACK or the NACK is determined based on the decoding result for the first information regardless of the decoding result for the second information.

* * * * *